United States Patent
Hamada et al.

(10) Patent No.: US 12,275,675 B1
(45) Date of Patent: Apr. 15, 2025

(54) COMBUSTION GAS BLEEDING PROBE AND METHOD FOR OPERATING SAME

(71) Applicant: TAIHEIYO CEMENT CORPORATION, Tokyo (JP)

(72) Inventors: Koki Hamada, Tokyo (JP); Kensuke Kitazawa, Tokyo (JP)

(73) Assignee: Taiheiyo Cement Corporation, Tokyo (JP)

( * ) Notice: Subject to any disclaimer, the term of this patent is extended or adjusted under 35 U.S.C. 154(b) by 0 days.

(21) Appl. No.: 18/845,355

(22) PCT Filed: Feb. 28, 2023

(86) PCT No.: PCT/JP2023/007239
§ 371 (c)(1),
(2) Date: Sep. 9, 2024

(87) PCT Pub. No.: WO2023/171460
PCT Pub. Date: Sep. 14, 2023

(30) Foreign Application Priority Data

Mar. 10, 2022 (JP) .................................. 2022-036926
Mar. 10, 2022 (JP) .................................. 2022-037146

(51) Int. Cl.
*C04B 7/36* (2006.01)
*F27D 17/00* (2025.01)
*F27D 17/20* (2025.01)

(52) U.S. Cl.
CPC .............. *C04B 7/364* (2013.01); *F27D 17/00* (2013.01); *F27D 17/20* (2025.01)

(58) Field of Classification Search
CPC .......... C04B 7/364; F27D 17/20; F27D 17/00
See application file for complete search history.

(56) References Cited

U.S. PATENT DOCUMENTS

2007/0098035 A1  5/2007  Shinichiro et al.
2011/0041586 A1  2/2011  Wada et al.
(Continued)

FOREIGN PATENT DOCUMENTS

CN      1714056 A    12/2005
CN      1882815 A    12/2006
(Continued)

OTHER PUBLICATIONS

Decision to Grant a Patent issued in Japanese Application No. 2022-037146, dated Aug. 15, 2023.
(Continued)

*Primary Examiner* — David Z Huang
*Assistant Examiner* — Jean F Morello
(74) *Attorney, Agent, or Firm* — Knobbe, Martens, Olson & Bear, LLP

(57) ABSTRACT

A combustion gas bleeding probe includes a gas pipe for bleeding a part of a combustion gas from a kiln, and a plurality of discharge ports each of which is provided penetrating through the gas pipe and each of which discharges a low-temperature gas in a direction that is perpendicular to a direction of flow of a bleed gas bled by the gas pipe and that is directed toward a center of the flow of the bleed gas. The discharge ports discharge the low temperature gas such that a ratio of a momentum of the low-temperature gas per discharge port to a momentum of the bleed gas satisfies 1.2 to 4.0, and a value (m-1) obtained by dividing a ratio of a wind speed of the low-temperature gas to a wind speed of the bleed gas by an inner diameter of the gas pipe satisfies 1.5 to 3.5.

5 Claims, 16 Drawing Sheets

(56) References Cited

U.S. PATENT DOCUMENTS

2011/0083745 A1    4/2011   Saito et al.
2014/0366499 A1    12/2014   Sakaniwa et al.

FOREIGN PATENT DOCUMENTS

| CN | 101959825 A | 1/2011 |
| CN | 211823871 U | 10/2020 |
| JP | 4435273 B1 | 3/2010 |
| JP | 2011-032130 A | 2/2011 |
| JP | 2011-056434 A | 3/2011 |
| JP | 4744299 B | 8/2011 |
| JP | 5051325 B | 10/2012 |
| JP | 2013-147401 A | 8/2013 |
| JP | 5290099 B2 | 9/2013 |
| JP | 5411126 B2 | 2/2014 |
| JP | 7343639 B1 | 9/2023 |
| JP | 7386913 B2 | 11/2023 |
| WO | WO 2005/050114 A1 | 6/2005 |

OTHER PUBLICATIONS

Decision to Grant a Patent issued in Japanese Application No. 2022-036926, dated Nov. 10, 2023.
International Search Report and Written Opinion issued in International Application No. PCT/JP2023/007239, mailed on Apr. 11, 2023.
Notice of Reasons for Refusal issued in Japanese Application No. 2022-036926, dated Aug. 9, 2023.
International Preliminary Report on Patentability issued in International Application No. PCT/JP2023/007239, dated Sep. 10, 2024.
Notice of Allowance issued in Chinese Application No. 202380025368.0, dated Jan. 2, 2025.

COMBUSTION GAS BLEEDING PROBE AND METHOD FOR OPERATING SAME

TECHNICAL FIELD

The present invention relates to a combustion gas bleeding probe and a method for operating the same.

BACKGROUND ART

In a chlorine bypass system, a chlorine-containing gas is bled from cement production equipment and discharged to the outside of the system, thereby preventing the coaching troubles of a kiln and a preheater system caused by chlorine. In the chlorine bypass system, a part of a combustion gas is bled by a combustion gas bleeding probe (hereinafter, also referred to as "probe") provided in the vicinity of a kiln inlet of a kiln constituting the cement production equipment. The bled combustion gas (hereinafter, also referred to as "bleed gas") is mixed with a low-temperature gas (hereinafter, also referred to as "cold air"), and a chlorine component contained in the bleed gas undergoes phase transition from a gaseous state to a solid state, and is recovered and removed out of the system in a form called chlorine bypass dust containing potassium chloride as a main component. At this time, it is known that the chlorine component is concentrated to the fine powder side of the bypass dust by rapidly cooling the bleed gas.

In the chlorine bypass system, a raw material component (coarse powder) and a chlorine component (fine powder) contained in the gas are separated by a cyclone, the raw material component is returned to the kiln side, and the chlorine component is discharged to the outside of the system. However, when the cooling rate is slow, the amount of the chlorine component returning to the kiln side together with the coarse powder having a low chlorine component concentration increases, and the chlorine removal efficiency decreases.

Meanwhile, in recent years, the utilization of wastes such as waste plastics has been promoted for the purpose of decarbonization and reduction of raw fuel costs, and the amount of chlorine (input chlorine amount) brought into the cement production equipment has increased. Therefore, it is necessary to enhance the capacity of the chlorine bypass system, that is, to increase a bleed air volume (=enhance a bleed rate). Meanwhile, when the bleed air volume is increased, it is necessary to increase the cold air amount (low temperature gas amount) to cool the gas temperature to a certain temperature or lower, accordingly, which makes it necessary to cope with an increase in a gas speed in the probe (maintenance of gas cooling), for example, to increase the size of the probe. Meanwhile, it is difficult to secure a facility location for increasing the size of a chlorine bypass system including a probe, and for example, it is necessary to increase the gas speed in the probe by utilizing existing facilities.

Patent Document 1 below describes that a low-temperature gas is discharged so as to have a momentum reaching the center part of a cross section in a center direction at a right angle with respect to the suction direction of a bleed gas to cool the bleed gas.

Patent Document 2 below describes that a low-temperature gas is discharged so that the momentum vector of the low-temperature gas has a vertically downward component in a center direction at a right angle with respect to the suction direction of a bleed gas to cool the bleed gas.

Patent Document 3 below describes that a low-temperature gas is discharged so that the direction of the synthetic vector of the momentum of the low-temperature gas has a component in a direction opposite to a direction from the center part of a probe cross section toward the center of gravity of the velocity distribution of a bleed gas to cool the bleed gas.

Patent Document 4 below describes a chlorine bypass device in which a turning part of a cooling pipe into which cold air is introduced is formed in an annular shape surrounding a bleed pipe.

PRIOR ART DOCUMENTS

Patent Document

Patent Document 1: JP-B-4744299
Patent Document 2: JP-B-5411126
Patent Document 3: JP-B-5290099
Patent Document 4: JP-B-5051325

SUMMARY OF THE INVENTION

Problems to be Solved by the Invention

In order to enhance the bleed rate, as described above, when the probe is increased in size, it is difficult for the low-temperature gas to reach the center of the probe, and when the gas velocity in the probe is increased, the residence time of the gas is reduced, so that the formation of a mixed cooling region in the probe is deteriorated, which makes it difficult to uniformly cool the probe in a short time. When the cooling of the bleed gas is insufficient, the amount of the chlorine component returning to the kiln side together with the crude powder having a low chlorine component concentration increases, and thus the chlorine removal efficiency by the chlorine bypass system decreases.

In Patent Documents 1 to 3, the low-temperature gas is discharged in a direction perpendicular to the bleed gas flowing through the probe to cool the bleed gas, but operation indexes regarding the discharge speed and momentum of the low-temperature gas when the bleed rate is enhanced are not specified.

In Patent Document 4, the cold air flows into the bleed pipe while turning in the turning part, and thus the bleed gas and the cold air are stirred and mixed, so that the bleed gas can be rapidly cooled by the cold air. However, since the cold air flows in while being turned, and the momentum of the cold air is attenuated until the bleed gas and the cold air are mixed, there is a possibility that sufficient cooling cannot be performed.

Depending on the blowing method and conditions of the cold air, the cold air leaks to (flow backward to or blow through) the kiln inlet, which promotes coaching adhesion (adversely affects kiln operation) and causes heat loss (additional fuel firing).

Therefore, an object of the present invention is to provide a combustion gas bleeding probe and a method for operating the same capable of sufficiently cooling a bleed gas even if a bleed rate is enhanced, and enabling operation while maintaining a predetermined chlorine removal efficiency. Another object of the present invention is to provide a combustion gas bleeding probe and a method for operating the same capable of sufficiently cooling a bleed gas even if a bleed rate is enhanced, and capable of suppressing the backflow of cold air to a kiln inlet.

Means for Solving the Problems

A combustion gas bleeding probe according to the present invention includes a gas pipe for bleeding a part of a combustion gas from a kiln, and a plurality of discharge ports each of which is provided penetrating through the gas pipe and each of which discharges a low-temperature gas in a direction that is perpendicular to a direction of flow of a bleed gas bled by the gas pipe and that is directed toward a center of the flow of the bleed gas.

The discharge ports discharge the low-temperature gas such that a ratio of a momentum of the low-temperature gas per discharge port to a momentum of the bleed gas satisfies 1.2 to 4.0, and a value ($m^{-1}$) obtained by dividing a ratio of a wind speed of the low-temperature gas to a wind speed of the bleed gas by an inner diameter of the gas pipe satisfies 1.5 to 3.5.

A method for operating a combustion gas bleeding probe according to the present invention is the method for the combustion gas bleeding probe including a gas pipe for bleeding a part of a combustion gas from a kiln, and a plurality of discharge ports each of which is provided penetrating through the gas pipe and each of which discharges a low-temperature gas in a direction that is perpendicular to a direction of flow of a bleed gas bled by the gas pipe and that is directed toward a center of the flow of the bleed gas.

A ratio of a momentum of the low-temperature gas per discharge port to a momentum of the bleed gas satisfies 1.2 to 4.0, and a value ($m^{-1}$) obtained by dividing a ratio of a wind speed of the low-temperature gas to a wind speed of the bleed gas by an inner diameter of the gas pipe satisfies 1.5 to 3.5.

The present invention is capable of sufficiently cooling a bleed gas even if a bleed rate is increased, and enables operation while maintaining a predetermined chlorine removal efficiency.

A combustion gas bleeding probe according to the present invention includes: a gas pipe for bleeding a part of a combustion gas from a kiln; and a plurality of discharge ports each of which is provided penetrating through the gas pipe and each of which discharges a low-temperature gas to a bleed gas bled by the gas pipe, wherein the plurality of discharge ports are disposed so that the low-temperature gases discharged from the discharge ports do not collide with each other in the gas pipe.

A method for operating a combustion gas bleeding probe according to the present invention is the method for the combustion gas bleeding probe, wherein a wind speed of the low-temperature gas discharged from the discharge port satisfies 25 to 180 m/s, and a ratio of a momentum of the low-temperature gas per discharge port to a momentum of the bleed gas satisfies 1.8 to 5.3.

The present invention is capable of sufficiently cooling a bleed gas even if a bleed rate is enhanced, and capable of suppressing the backflow of cold air to a kiln inlet.

MODE FOR CARRYING OUT THE INVENTION

First Embodiment

Figure 1:
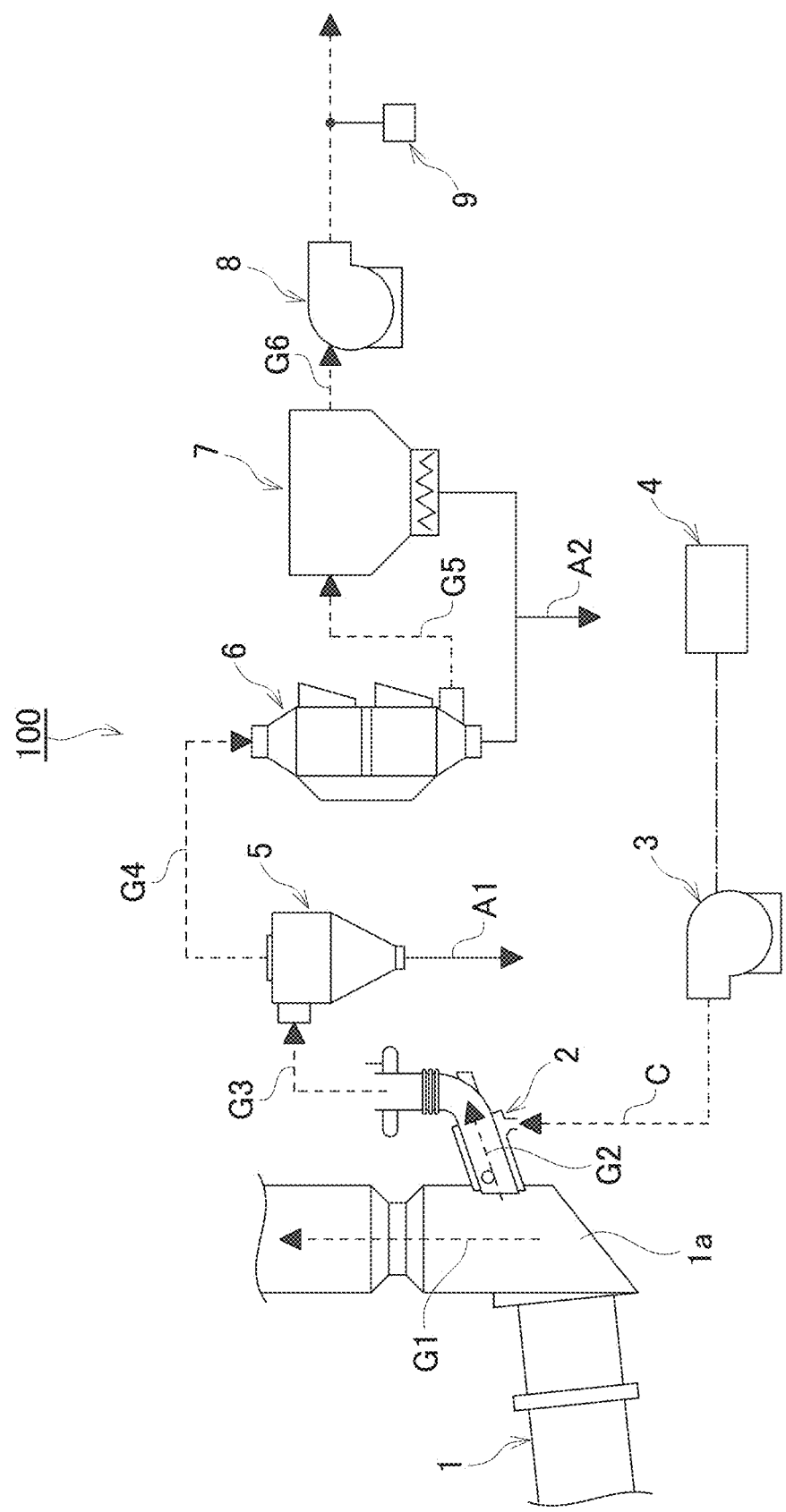
FIG. 1 is an overall configuration diagram showing a chlorine bypass system including a combustion gas bleeding probe according to a first embodiment of the present invention.

Hereinafter, a combustion gas bleeding probe and a method for operating the same according to a first embodiment of the present invention will be described with reference to FIGS. 1 to 3. In the drawings, dimensional ratios of the drawings do not necessarily coincide with actual dimensional ratios, and dimensional ratios in the drawings do not necessarily coincide with each other.

FIG. 1 is an overall configuration diagram schematically showing a chlorine bypass system including a combustion gas bleeding probe according to a first embodiment of the present invention. A chlorine bypass system 100 includes a probe 2 that bleeds a part of a combustion gas G1 from a kiln exhaust gas flow path from a kiln inlet 1a of a kiln 1 to a lowermost cyclone (not illustrated), a cold air fan 3 that supplies cold air C (corresponding to a low-temperature gas) to the probe 2, an inverter 4 that adjusts the output of the cold air fan 3, a cyclone 5 as a classifier that separates a coarse powder A1 contained in a mixed gas G3 obtained by mixing a bleed gas G2 and the cold air C, a cooler 6 that cools a mixed gas G4 containing a fine powder A2 discharged from the cyclone 5, a dust collector 7 that recovers the fine powder A2 from an exhaust gas G5 discharged from the cooler 6, an exhaust fan 8 that induces an exhaust gas G6 of the dust collector 7, and a measuring instrument 9 (an anemometer, a thermometer, or the like) that measures the wind speed or the like of the exhaust fan 8.

Figure 2:
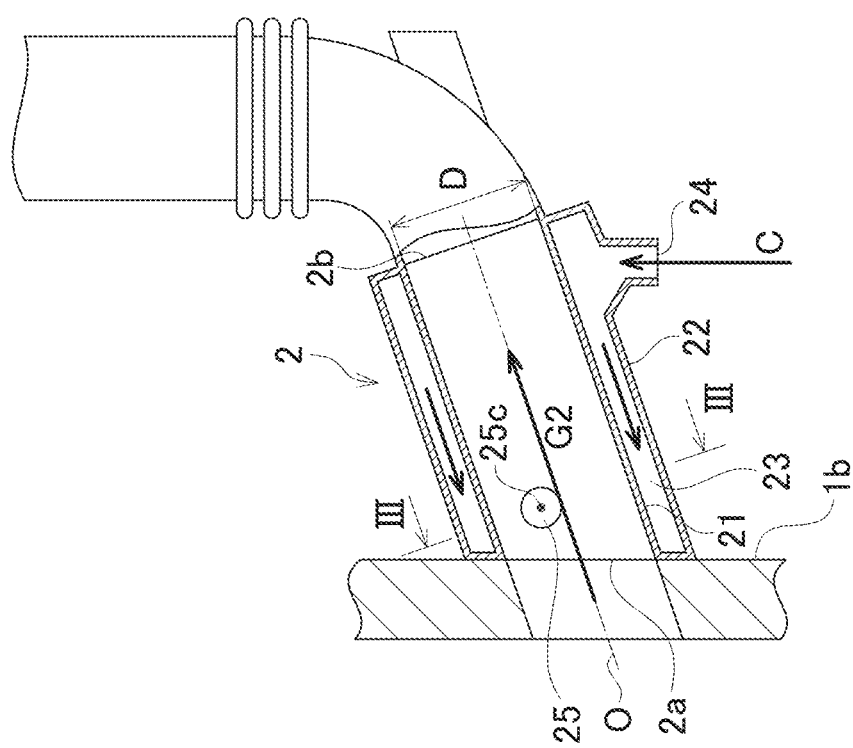
FIG. 2 is a cross-sectional view schematically showing the probe.

FIG. 2 is a cross-sectional view schematically showing the probe 2. The probe 2 is protrusively provided at a rising part 1b directed upward as a part of the kiln exhaust gas flow path from the kiln inlet 1a. An inlet 2a of the probe 2 is opened to the kiln exhaust gas flow path in the rising part 1b. The bleed rate by the probe 2 is 5% or more, and preferably 10 to 15%. The bleed rate refers to a proportion (ratio) of the gas air volume (Nm3/unit time) of the bleed gas G2 bled in a unit time to the gas air volume (Nm3/unit time) of the combustion gas G1 passing through the kiln inlet 1a in a unit time.

The bleeding amount of the bleed gas G2 is preferably 2,500 Nm3/h or more, and more preferably 10,000 Nm3/h or more.

The probe 2 includes a cylindrical inner pipe 21 (corresponding to a gas pipe), a cylindrical outer pipe 22 surrounding the inner pipe 21, a cold air passage 23 formed between the inner pipe 21 and the outer pipe 22, and a supply port 24 for supplying cold air from the cold air fan 3 to the cold air passage 23. The bleed gas G2 flows in the inner pipe 21 in the direction of an arrow.

The probe 2 includes a plurality of discharge ports 25 provided penetrating through the inner pipe 21 and discharging the cold air C supplied to the cold air passage 23 toward the bleed gas G2. The discharge port 25 is formed in a circular shape.

Figure 3:
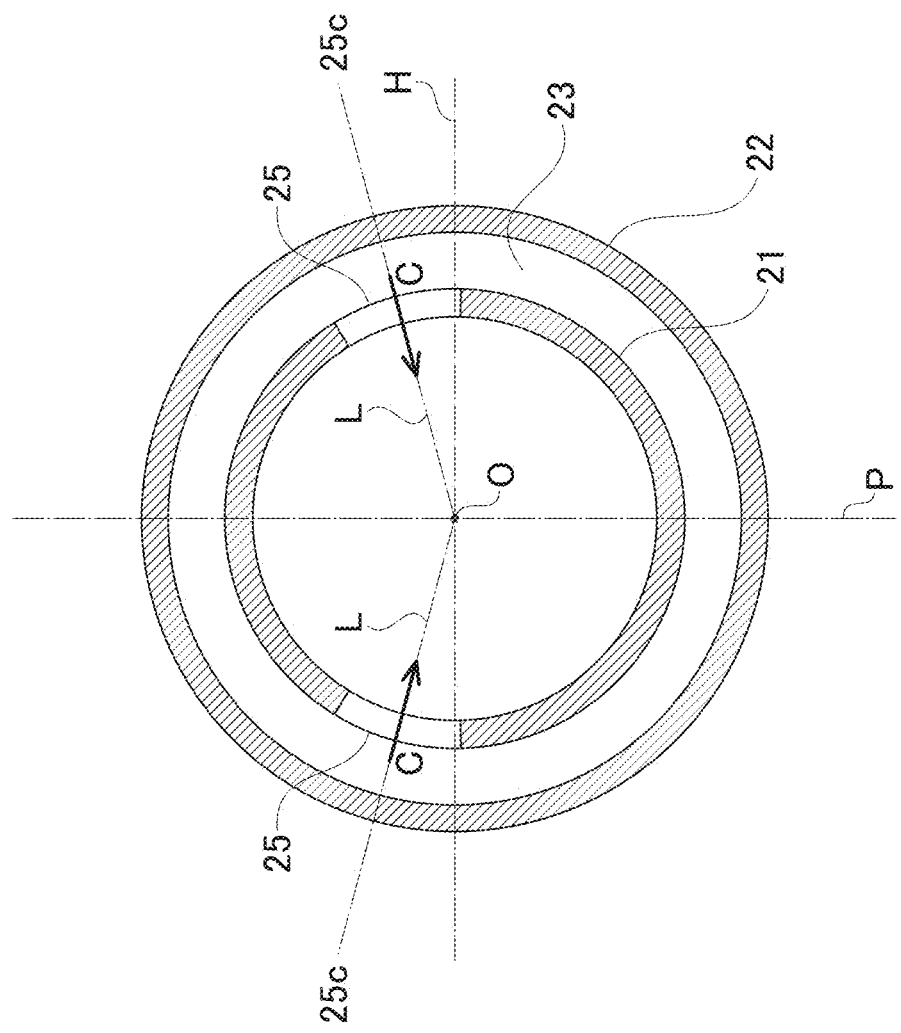
FIG. 3 is a cross-sectional view taken along line III-III of FIG. 2.

FIG. 3 is a view taken along line III-III in FIG. 2. The plurality of discharge ports 25 are disposed at substantially the same position in the extending direction of the inner pipe 21, and are preferably disposed at the same position. In other words, the plurality of discharge ports 25 are preferably disposed in a plane perpendicular to the extending direction of the inner pipe 21. The plurality of discharge ports 25 discharge the cold air C in a direction perpendicular to the direction of flow of the bleed gas G2 in the inner pipe 21. However, as will be described later, the plurality of discharge ports 25 need not be disposed at completely the same position in the extending direction of the inner pipe 21 as long as the cold airs C discharged from the discharge ports 25 can collide with each other and diffuse.

In the present embodiment, the two discharge ports 25 are provided at positions in line symmetry with a vertical line P passing through a center O of the inner pipe 21 as an axis of symmetry. The two discharge ports 25 are respectively disposed on the left and right sides such that an angle formed by a straight line L connecting a center 25c of the discharge port 25 and the center O of the inner pipe 21 and a horizontal line H passing through the center O of the inner pipe 21 is 15°. The two discharge ports 25 discharge the cold air C toward the center O of the inner pipe 21. In other words, the two discharge ports 25 respectively discharge the cold air C toward the center of the flow of the bleed gas G2 in the inner pipe 21. Therefore, the cold airs C discharged from the two discharge ports 25 collide with each other and diffuse near the center O of the inner pipe 21. This enables sufficient mixing of the cold air C and the bleed gas G2.

Meanwhile, the cold air C after the collision also has a velocity vector in a direction opposite to the direction of flow of the bleed gas G2, that is, in a direction toward the kiln inlet 1a. When the air volume of the cold air C flowing toward the kiln inlet 1a becomes excessive, the reverse flow of the cold air C to the kiln inlet 1a occurs, which may cause heat loss.

The chlorine bypass system 100 includes a control unit (not illustrated). The control unit can grasp the air volume and momentum of the bleed gas G2 in real time from an exhaust air volume calculated from the measurement value of the measuring instrument 9 and a cold air volume discharged from the cold air fan 3, and can constantly operate the cold air fan 3 having an optimum output by controlling the inverter 4.

In the present specification, the momentum (per unit time) of the gas is defined as follows.

$$\text{Momentum of gas}[kg \cdot m/s^2] = \text{density}[kg/m^3] \times \text{wind speed}[m/s] \times \text{air volume}[m^3/s]$$

The control unit adjusts the output of the cold air fan 3 such that the ratio (MC/MG) of the momentum MC of the cold air C calculated from the wind speed, air volume, and temperature of the cold air C per discharge port 25 to the momentum MG of the bleed gas G2 calculated from the wind speed, air volume, and temperature of the bleed gas G2 at the inlet 2a of the probe 2 falls within the range of 1.2 to 4.0, and the value $[m^{-1}]$ obtained by dividing the ratio (VC/VG) of the wind speed VC of the cold air C to the wind speed VG of the bleed gas G2 by the probe diameter D falls within the range of 1.5 to 3.5. This is capable of sufficiently cooling the bleed gas G2 even if the bleed rate is increased, and enables operation while maintaining a predetermined chlorine removal efficiency (see Example 1 described in deinlet later).

When the ratio of the momentum (MC/MG) is excessively lowered, the momentum MC of the cold air C is smaller than the momentum MG of the bleed gas G2, so that it is difficult to obtain sufficient mixing with the bleed gas G2. Therefore, the ratio of momentum (MC/MG) is 1.2 or more, and preferably 3.0 or more.

Meanwhile, when the ratio of momentum (MC/MG) is excessively increased, the pressure loss increases, which makes it also necessary to increase the size of the cold air fan 3. The reduction proportion of the temperature deviation (to be described in deinlet later) in the outlet cross section 2b of the probe 2 decreases with an increase in the ratio of momentum (MC/MG), while the amount of cold air flowing backward in the probe 2 and reaching the kiln inlet 1a increases. Therefore, the ratio of momentum (MC/MG) is 4.0 or less, and preferably 3.6 or less.

When the ratio of the wind speed/the probe diameter (VC/VG/D) is excessively lowered, the cold air C is caused to flow toward the cyclone 5 by the bleed gas G2 before the cold air C collides and diffuses, which makes it difficult to obtain sufficient mixing. Therefore, the ratio of the wind speed/the probe diameter (VC/VG/D) is preferably 1.5 or more, and more preferably 2.3 or more.

When the ratio of the wind speed/the probe diameter (VC/VG/D) is excessively increased, the pressure loss increases, which makes it also necessary to increase the size of the cold air fan 3. The amount of cold air flowing backward in the probe 2 and reaching the kiln inlet 1a increases. Therefore, the ratio of the wind speed/the probe diameter (VC/VG/D) is preferably 3.5 or less, and more preferably 3.0 or less.

The wind speed VC of the cold air C is preferably 25 to 180 m/s, and more preferably 50 to 150 m/s.

The ratio of momentum (MC/MG) may be increased by providing a variable nozzle (not illustrated) that varies the opening area of the discharge port 25 and increasing only the wind speed VC while maintaining the air volume of the cold air C.

Example 1

Hereinafter, specific Examples and the like will be described in order to describe the present invention in more deinlet, but the present invention is not limited to the aspects of these Examples.

The present inventors have searched for factors contributing to the improvement of the cooling efficiency of a bleed gas G2 through the simulation analysis of a mixed state of the bleed gas G2 and cold air C. Software used for the simulation analysis is Fluent 2020 R2 manufactured by ANSYS. A bleed rate in a chlorine bypass system 100 was set to 5 to 15%. Cold air C had a temperature of 20° C., and the cold air C was introduced so that an average temperature in the outlet cross section 2b (see FIG. 2) of a probe 2 was 400° C. Under each condition, the speed of the cold air C is changed while maintaining a predetermined air volume by adjusting the area of a discharge port 25.

Analysis 1

A temperature distribution in the probe 2 in which the bleed rate, the wind speed of the cold air C (indicated as "cold air speed" in Table 1), and a probe diameter D were changed was evaluated. The shape of the probe 2 used for the simulation analysis is a shape shown in FIGS. 2 and 3. The analysis conditions are shown in Table 1. The bleed rate was 5 to 15%, and the cold air speed was 28 to 200 m/s. The size of the probe 2 was set based on the ratio of a momentum (MC/MG) between the cold air C and the bleed gas G2, and the like, and the analysis 1 was carried out by setting the cross-sectional area of each of Analysis Examples 1-1 to 3-2 to an A type, enlarging the cross-sectional area of each of Analysis Examples 4-1 to 4-4 to 1.5 times the A type, and reducing the cross-sectional area of each of Analysis Examples 5-1 to 5-2 to 0.5 times the A type. In Table 1, the "cold air-bleed gas momentum ratio" means the ratio (MC/MG) of the momentum MC of the cold air C per discharge port 25 to the momentum MG of the bleed gas G2, and the "cold air-bleed gas wind speed ratio/probe diameter" means the ratio/probe diameter D (VC/VG/D) of the wind speed VC of the cold air C to the wind speed VG of the bleed gas G2 (the same applies to Tables 2 to 4 described later).

Analysis 2

Figure 4A:
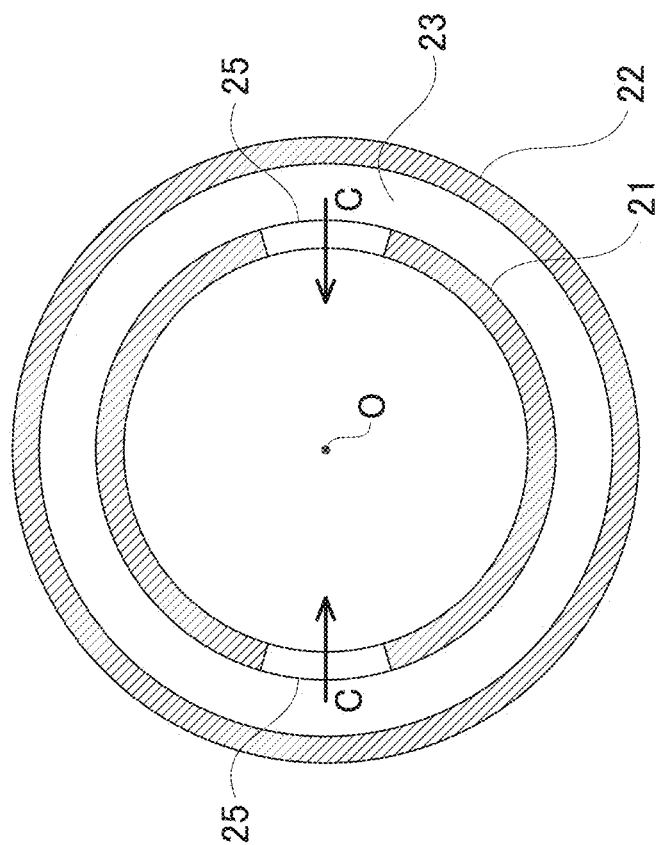
FIG. 4A is a cross-sectional view showing the "lateral" arrangement of a discharge port in Analysis 2.
Figure 4B:
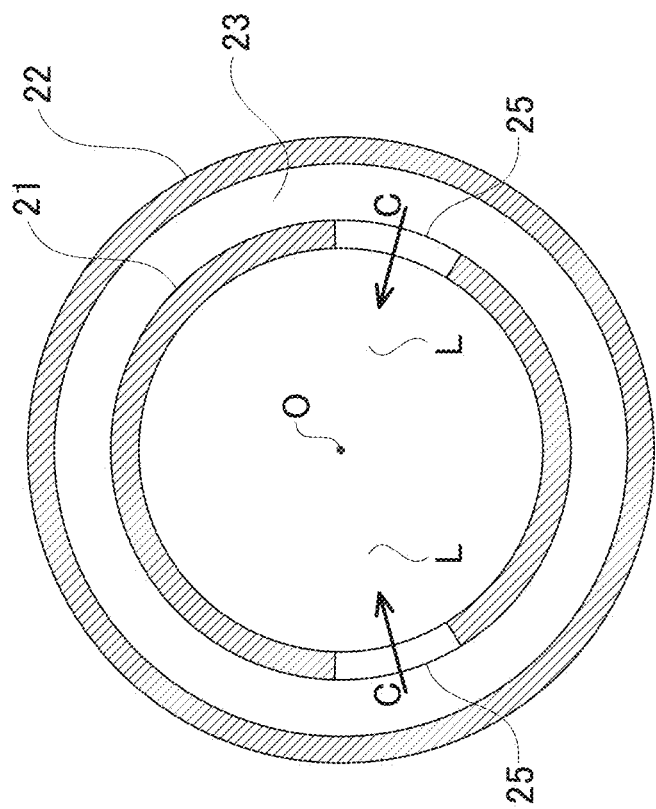
FIG. 4B is a cross-sectional view showing the "lower" arrangement of a discharge port in Analysis 2.
Figure 4C:
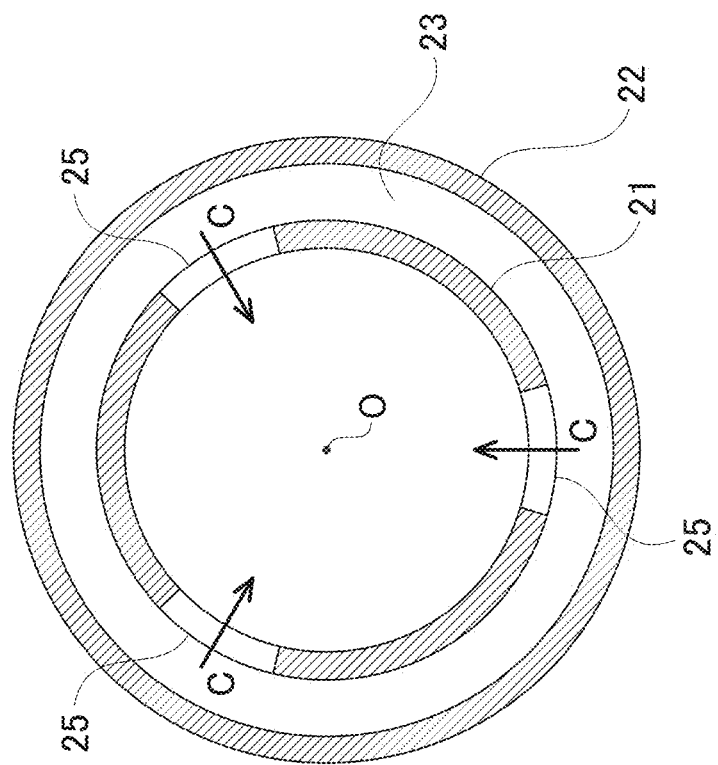
FIG. 4C is a cross-sectional view showing the "Y" arrangement of a discharge port in Analysis 2.
Figure 4D:
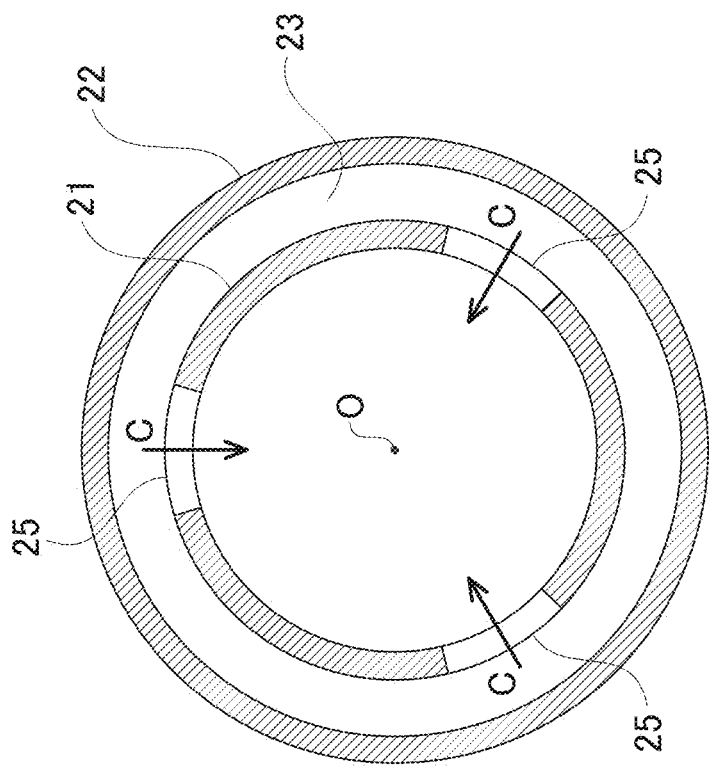
FIG. 4D is a cross-sectional view showing the arrangement of the "reverse Y" of a discharge port in Analysis 2.

In the A-type probe 2, the arrangement and number of the discharge ports 25 were changed. The analysis conditions are shown in Table 2, and the arrangement conditions of the discharge ports 25 are shown in FIGS. 4A to 4D. In Table 2, "lateral" indicates that the arrangement of the discharge ports 25 is shown in FIG. 4A, "lower" indicates that the arrangement of the discharge ports 25 is shown in FIG. 4B, "Y" indicates that the arrangement of the discharge ports 25 is shown in FIG. 4C, and "reverse Y" indicates that the arrangement of the discharge ports 25 is shown in FIG. 4D (the same applies to Table 4 described later).

TABLE 1

| | | Conditions | | | |
|---|---|---|---|---|---|
| Analysis examples | Bleed rate (%) | Cold air speed (m/s) | Cold air-bleed gas momentum ratio | Cold air-bleed gas wind speed ratio/ probe diameter (m-1) | Probe size |
| 1-1 | 10 | 28 | 1 | 0.9 | Standard (A) |
| 1-2 | | 50 | 1.8 | 1.6 | |
| 1-3 | | 87 | 3.1 | 2.8 | |
| 1-4 | | 150 | 5.3 | 4.9 | |
| 2-1 | 15 | 50 | 1.2 | 1.1 | |
| 2-2 | | 87 | 2.1 | 1.9 | |
| 2-3 | | 150 | 3.6 | 3.2 | |
| 2-4 | | 200 | 4.7 | 4.3 | |

TABLE 1-continued

| | | Conditions | | | |
|---|---|---|---|---|---|
| Analysis examples | Bleed rate (%) | Cold air speed (m/s) | Cold air-bleed gas momentum ratio | Cold air-bleed gas wind speed ratio/ probe diameter (m-1) | Probe size |
| 3-1 | 5 | 28 | 2 | 1.8 | |
| 3-2 | | 50 | 3.6 | 3.2 | |
| 4-1 | 15 | 50 | 1.8 | 1.3 | Enlargement (1.5A) |
| 4-2 | | 87 | 3.1 | 2.3 | |
| 4-3 | | 150 | 5.3 | 4 | |
| 4-4 | | 200 | 7.1 | 5.3 | |
| 5-1 | 5 | 28 | 0.7 | 1.3 | Reduction (0.5A) |
| 5-2 | | 50 | 1.2 | 2.3 | |

TABLE 2

| | | Conditions | | | |
|---|---|---|---|---|---|
| Analysis examples | Bleed rate (%) | Cold air speed (m/s) | Cold air-bleed gas momentum ratio | Cold air-bleed gas wind speed ratio/ probe diameter (m-1) | Probe size |
| Lateral-1 | 10 | 87 | 3.1 | 2.8 | Standard (A) |
| Lateral-2 | | 150 | 5.3 | 4.9 | |
| Lower-1 | | 87 | 3.1 | 2.8 | |
| Lower-2 | | 150 | 5.3 | 4.9 | |
| Y-1 | | 87 | 2.1 | 2.8 | |
| Y-2 | | 150 | 3.6 | 4.9 | |
| Reverse Y-1 | | 87 | 2.1 | 2.8 | |
| Reverse Y-2 | | 150 | 3.6 | 4.9 | |

From the viewpoint of introducing cold air C so that an average temperature in the outlet cross section 2b of the probe 2 was 400° C. and lowering the temperature of the bleed gas G2 to 600 to 700° C. or lower, which was the melting point of a chlorine compound (see Japanese Patent No. 4294871), the degree of gas cooling was determined based on whether or not a temperature deviation in the outlet cross section 2b of the probe 2 was 200° C. or lower. Here, the temperature deviation in the outlet cross section 2b of the probe 2 is a variation from the average temperature in the outlet cross section 2b.

There is a concern about the mixing (backflow) of the cold air C into the kiln inlet 1a due to an increase in the wind speed of the cold air C. Therefore, in order to quantify the cold air volume reaching the kiln inlet 1a with respect to the cold air volume, the backflow rate of the introduced cold air C was calculated from a temperature decrease (difference from the temperature of the kiln inlet 1a) at a joint part (inlet 2a) between the probe 2 and the kiln inlet 1a. This backflow rate can be regarded as one of indices of the force with which the discharged cold air C collides and diffuses, and when this value is high, the value indicates that the mixing force of the cold air C in the probe 2 is strong. In the fluid simulation, almost the entire amount of the cold air C having reached the kiln inlet 1a flows to the side of the probe 2 again. Meanwhile, when the amount of the cold air C becomes excessive, the cold air C blows through the kiln inlet 1a, which may cause heat loss. Therefore, it is desired to suppress the backflow rate as much as possible, and in this analysis, the backflow rate is set to 10% or less.

Table 3 shows the temperature deviation and the backflow rate in the outlet cross section 2b of the probe 2 in Analysis 1. In Table 3, "good" indicates that the temperature deviation in the outlet cross section 2b of the probe 2 is 200° C. or lower and the backflow rate is 10% or less, and "poor" indicates that the temperature deviation in the outlet cross section 2b of the probe 2 exceeds 200° C. or the backflow rate exceeds 10%.

TABLE 3

| | Results | | | Conditions | | | | |
|---|---|---|---|---|---|---|---|---|
| | | | | | | Cold air-bleed | Cold air-bleed gas | |
| Analysis examples | Temperature deviation (° C.) | Backflow rate (%) | Determination | Bleed rate (%) | Cold air speed (m/s) | gas momentum ratio | wind speed ratio/probe diameter ($m^{-1}$) | Probe size |
| 1-1 | 344 | 0 | Poor | 10 | 28 | 1 | 0.9 | Standard |
| 1-2 | 158 | 0 | Good | | 50 | 1.8 | 1.6 | (A) |
| 1-3 | 92 | 7.3 | Good | | 87 | 3.1 | 2.8 | |
| 1-4 | 56 | 12.2 | Poor | | 150 | 5.3 | 4.9 | |
| 2-1 | 232 | 0 | Poor | 15 | 50 | 1.2 | 1.1 | |
| 2-2 | 122 | 5.7 | Good | | 87 | 2.1 | 1.9 | |
| 2-3 | 67 | 9.8 | Good | | 150 | 3.6 | 3.2 | |
| 2-4 | 62 | 21.2 | Poor | | 200 | 4.7 | 4.3 | |
| 3-1 | 187 | 0 | Good | 5 | 28 | 2 | 1.8 | |
| 3-2 | 103 | 8.6 | Good | | 50 | 3.6 | 3.2 | |
| 4-1 | 365 | 0 | Poor | 15 | 50 | 1.8 | 1.3 | Enlargement |
| 4-2 | 174 | 2.7 | Good | | 87 | 3.1 | 2.3 | (1.5 A) |
| 4-3 | 120 | 22.7 | Poor | | 150 | 5.3 | 4 | |
| 4-4 | 98 | 30 | Poor | | 200 | 7.1 | 5.3 | |
| 5-1 | 266 | 0 | Poor | 5 | 28 | 0.7 | 1.3 | Reduction |
| 5-2 | 124 | 0 | Good | | 50 | 1.2 | 2.3 | (0.5 A) |

As the cold air-bleed gas momentum ratio increased, the temperature deviation decreased, and the temperature deviation tended to decrease even under conditions of the bleed rate of 15% and different probe diameters.

Figure 5:
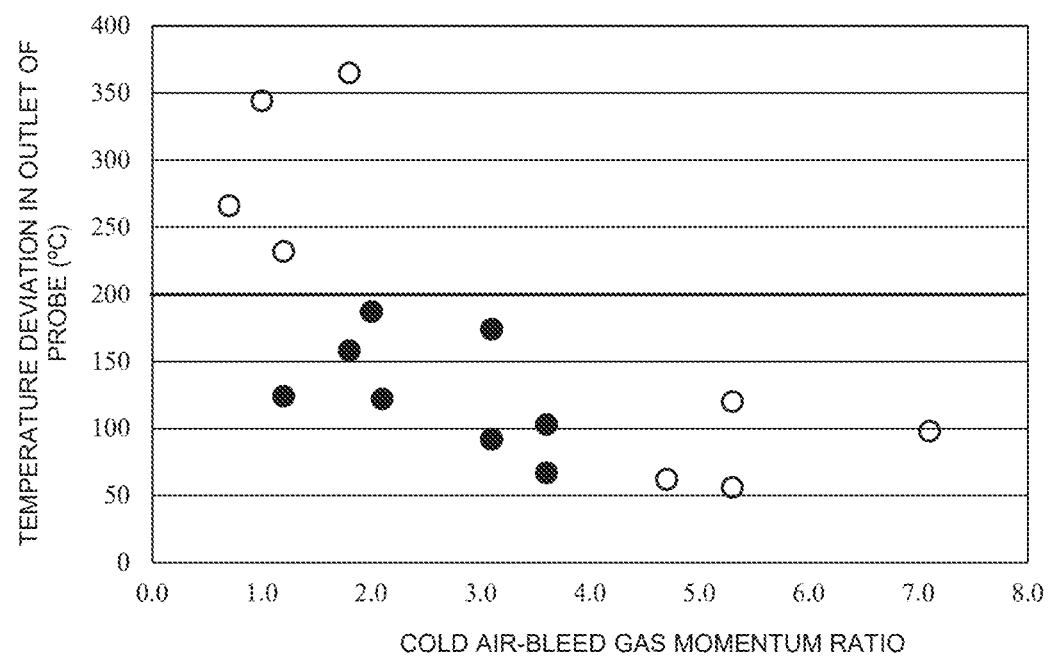
FIG. 5 is a graph showing a relationship between a cold air-bleed gas momentum ratio and a temperature deviation in the outlet cross section of the probe.

FIG. 5 shows a relationship between a cold air-bleed gas momentum ratio in Analysis 1 and a temperature deviation in the outlet cross section 2b of the probe 2. A void part is a condition set as "poor" in the determination, and a filled part is a condition set as "good" in the determination (the same applies to FIG. 6). A correlation between the cold air-bleed gas momentum ratio and the temperature deviation in the outlet cross section 2b of the probe 2 was confirmed regardless of the bleed rate and the probe diameter D. Meanwhile, the operating condition cannot be defined only by the cold air-bleed gas momentum ratio.

Figure 6:
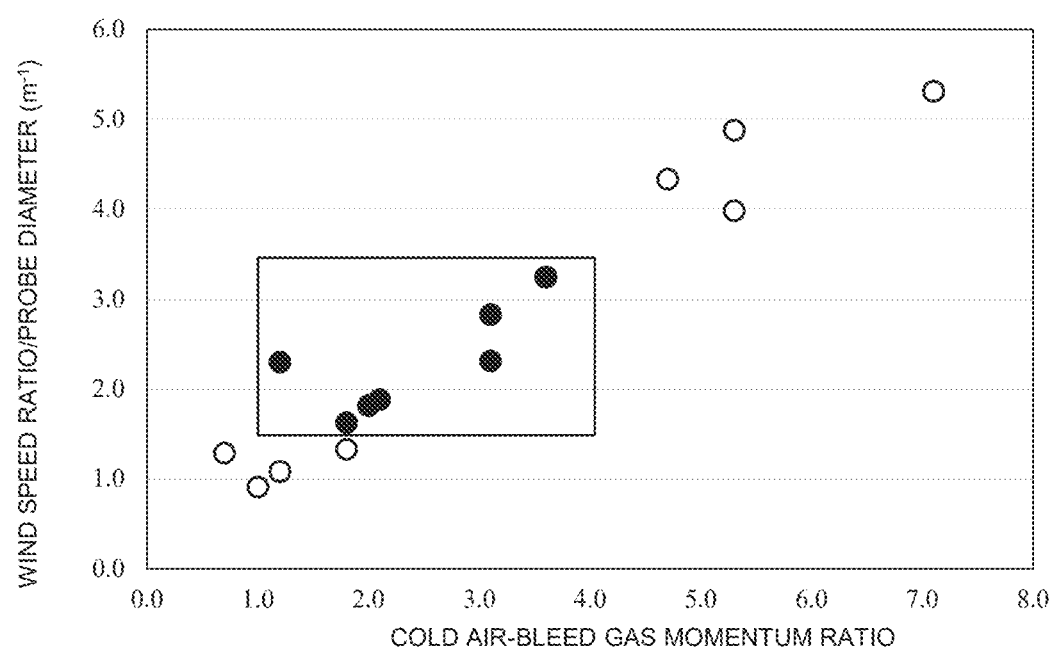
FIG. 6 is a graph showing a relationship between a cold air-bleed gas momentum ratio and a cold air-bleed gas wind speed ratio/probe diameter.

Therefore, the present inventors made a determination using an index including the factors of the wind speed and the probe diameter D as factors related to the collision of the cold air C in addition to the cold air-bleed gas momentum ratio. The results are shown in FIG. 6. As shown in FIG. 6, when the cold air-bleed gas momentum ratio was within the range of 1.2 to 4.0 and the cold air-bleed gas wind speed ratio/probe diameter ($m^{-1}$) was within the range of 1.5 to 3.5, the temperature deviation in the outlet cross section 2b of the probe 2 was 200° C. or lower regardless of the bleed rate and the probe diameter D. Therefore, by using this index, the sufficient cooling performance of the chlorine bypass system can be easily achieved even in different chlorine bypass systems.

Table 4 shows the temperature deviation in the outlet cross section 2b of the probe 2 in Analysis 2. In Table 4, "good" indicates that the reverse flow rate is 10% or less, and "poor" indicates that the reverse flow rate exceeds 10%.

TABLE 4

| | Results | | | Conditions | | | | |
|---|---|---|---|---|---|---|---|---|
| | | | | | | Cold air- | Cold air-bleed gas | |
| Analysis examples | Temperature deviation (° C.) | Backflow rate (%) | Determination | Bleed rate (%) | Cold air speed (m/s) | bleed gas momentum ratio | wind speed ratio/probe diameter ($m^{-1}$) | Probe size |
| Lateral-1 | 62 | 8.5 | Good | 10 | 87 | 3.1 | 2.8 | Standard |
| Lateral-2 | 41 | 13.5 | Poor | | 150 | 5.3 | 4.9 | (A) |
| Lower-1 | 84 | 6.8 | Good | | 87 | 3.1 | 2.8 | |
| Lower-2 | 52 | 11.4 | Poor | | 150 | 5.3 | 4.9 | |
| Y-1 | 100 | 7.5 | Good | | 87 | 2.1 | 2.8 | |
| Y-2 | 56 | 12.4 | Poor | | 150 | 3.6 | 4.9 | |
| Reverse Y-1 | 96 | 8.1 | Good | | 87 | 2.1 | 2.8 | |
| Reverse Y-2 | 66 | 12.9 | Poor | | 150 | 3.6 | 4.9 | |

Regardless of the arrangement of the discharge port 25, the temperature deviation in the outlet cross section 2b of the probe 2 tended to decrease as the cold air-bleed gas momentum ratio increased. Therefore, it is possible to achieve predetermined cooling performance by controlling the cold air-bleed gas momentum ratio regardless of the arrangement of the discharge port 25. Note that the cooling performance is the highest when the discharge port 25 is "laterally" disposed. That is, it is preferable that the plurality of discharge ports 25 include a pair of discharge ports 25 that are disposed opposite to each other on both sides of the inner pipe 21 in the horizontal direction and discharge the cold air C in the horizontal direction. This is considered to be because when the cold airs C discharged in the horizontal direction from the pair of discharge ports 25 disposed opposite to each other on both sides in the horizontal direction collide with each other from the front, the cold air C is less likely to drift in the vertical direction and cooling performance is high.

As described above, the probe 2 according to the present embodiment includes the inner pipe 21 for bleeding a part of the combustion gas G1 from the kiln 1, and the plurality of discharge ports 25 each of which is provided penetrating through the inner pipe 21 and each of which discharges cold air C in a direction that is perpendicular to the direction of flow of the bleed gas G2 bled by the inner pipe 21 and that is directed toward the center of the flow of the bleed gas G2. The discharge ports 25 discharge the cold air C such that the ratio (MC/MG) of the momentum MC of the cold air C per discharge port 25 to the momentum MG of the bleed gas G2 satisfies 1.2 to 4.0, and the value ($m^{-1}$) obtained by dividing the ratio (VC/VG) of the wind speed VC of the cold air C to the wind speed VG of the bleed gas G2 by the inner diameter D of the inner pipe 21 satisfies 1.5 to 3.5.

This configuration is capable of sufficiently cooling the bleed gas G2 even if the bleed rate is increased, and enables operation while maintaining a predetermined chlorine removal efficiency.

In the probe 2 according to the present embodiment, it is preferable that the plurality of discharge ports 25 include the pair of discharge ports 25 that are disposed opposite to each other on both sides of the inner pipe 21 in the horizontal direction and discharge the cold air C in the horizontal direction.

According to this configuration, good cooling performance can be achieved.

In the probe 2 according to the present embodiment, the wind speed VC of the cold air C is preferably 25 to 180 m/s.

According to this configuration, good cooling performance can be achieved.

In the probe 2 according to the present embodiment, it is preferable that the cold airs C discharged from the plurality of discharge ports 25 each have a velocity vector in a direction opposite to the direction of flow of the bleed gas G2 after colliding with each other, and the ratio of the cold air C flowing backward to the kiln inlet 1a to the discharged cold air C is 10% or less.

This configuration can suppress the backflow rate to be low and suppress heat loss.

The method for operating the probe 2 according to the present embodiment is a method for operating the probe 2 including the inner pipe 21 for bleeding a part of the combustion gas G1 from the kiln 1, and the plurality of discharge ports 25 each of which is provided penetrating through the inner pipe 21 and each of which discharges cold air C in a direction that is perpendicular to the direction of flow of the bleed gas G2 bled by the inner pipe 21 and that is directed toward the center of the flow of the bleed gas G2. The ratio (MC/MG) of the momentum MC of the cold air C per discharge port 25 to the momentum MG of the bleed gas G2 satisfies 1.2 to 4.0, and the value ($m^{-1}$) obtained by dividing the ratio (VC/VG) of the wind speed VC of the cold air C to the wind speed VG of the bleed gas G2 by the inner diameter D of the inner pipe 21 satisfies 1.5 to 3.5.

This configuration is capable of sufficiently cooling the bleed gas G2 even if the bleed rate is increased, and enables operation while maintaining a predetermined chlorine removal efficiency.

Note that the configurations of the combustion gas bleeding probe and the method for operating the same are not limited to those of the above-described embodiments, and the functions and effects of the combustion gas bleeding probe and the method for operating the same are not limited to those of the above-described embodiments. It is needless to say that various modifications can be made to the combustion gas bleeding probe without departing from the gist of the present invention. For example, the configurations, methods, and the like of the plurality of embodiments described above may be optionally adopted and combined. It is a matter of course that one or two or more of configurations, methods, and the like according to various modifications described below may be optionally selected and adopted for the configurations, methods, and the like according to the embodiments described above.

In the probe 2 according to the above embodiment, the two discharge ports 25 are provided penetrating through the inner pipe 21. However, the probe 2 is not limited to such a configuration. For example, as shown in FIG. 4A, three or more discharge ports 25 may be provided penetrating through the inner pipe 21. When three or more discharge ports 25 are provided, the discharge ports 25 are preferably disposed at equal intervals in the circumferential direction of the inner pipe 21.

Second Embodiment

Hereinafter, a second embodiment of a combustion gas bleeding probe and a method for operating the same according to the present invention will be described with reference to FIGS. 7 to 9. In the drawings, dimensional ratios of the drawings do not necessarily coincide with actual dimensional ratios, and dimensional ratios in the drawings do not necessarily coincide with each other.

Figure 7:
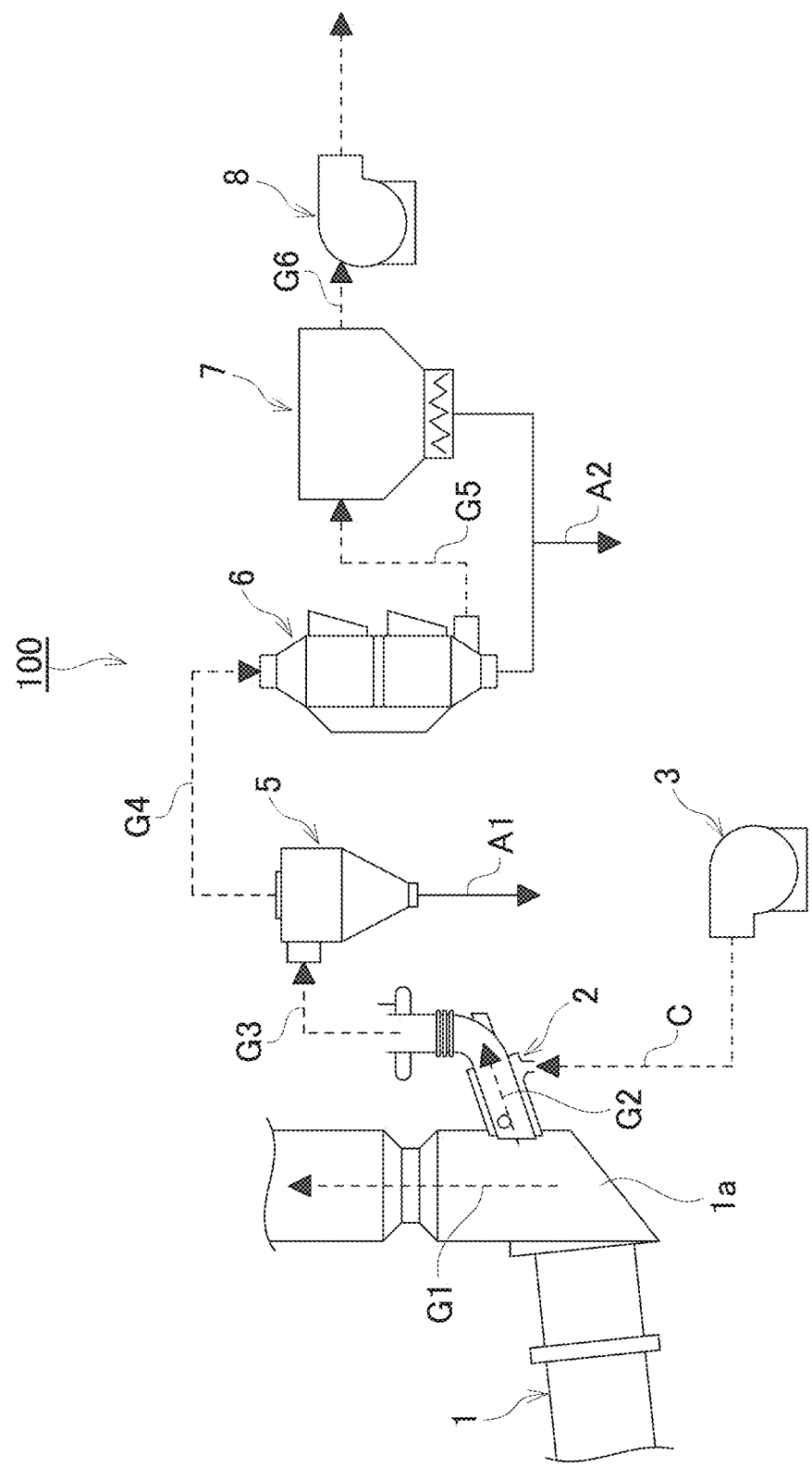
FIG. 7 is an overall configuration diagram showing a chlorine bypass system including a combustion gas bleeding probe according to a second embodiment of the present invention.

FIG. 7 is an overall configuration diagram schematically showing a chlorine bypass system including a combustion gas bleeding probe according to a second embodiment of the present invention. A chlorine bypass system 100 includes a probe 2 that bleeds a part of a combustion gas G1 from a kiln exhaust gas flow path from a kiln inlet 1a of a kiln 1 to a lowermost cyclone (not illustrated), a cold air fan 3 that supplies cold air C (corresponding to a low-temperature gas) to the probe 2, a cyclone 5 as a classifier that separates a coarse powder A1 contained in a mixed gas G3 obtained by mixing a bleed gas G2 and the cold air C, a cooler 6 that cools a mixed gas G4 containing a fine powder A2 discharged from the cyclone 5, a dust collector 7 that recovers the fine powder A2 from an exhaust gas G5 discharged from the cooler 6, and an exhaust fan 8 that induces an exhaust gas G6 of the dust collector 7.

Figure 8:
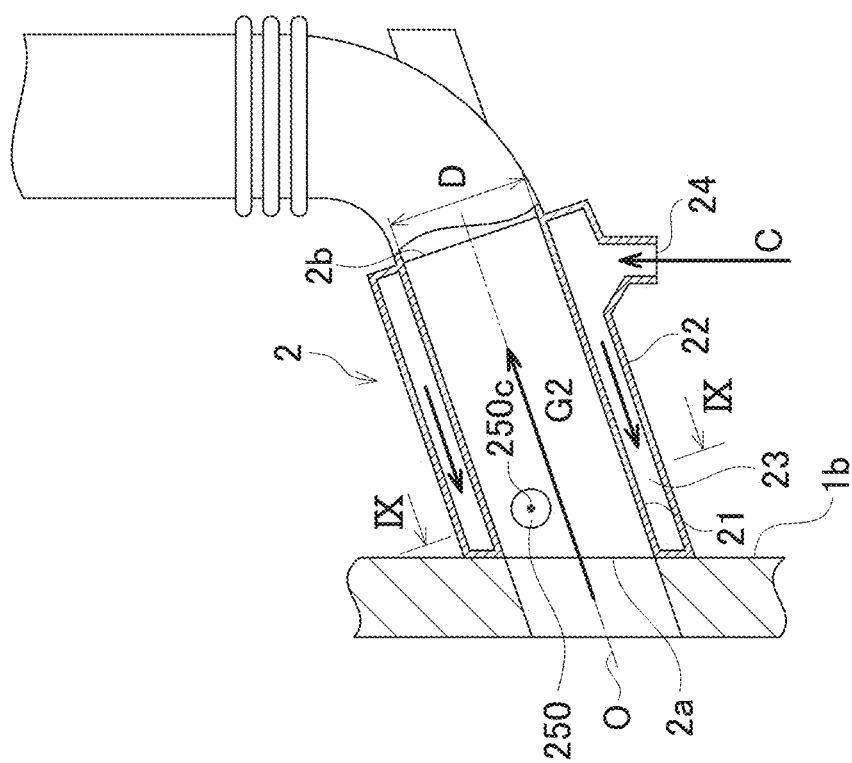
FIG. 8 is a cross-sectional view schematically showing the probe.

FIG. 8 is a cross-sectional view schematically showing the probe 2. The probe 2 is protrusively provided at a rising part 1b directed upward as a part of the kiln exhaust gas flow path from the kiln inlet 1a. An inlet 2a of the probe 2 is opened to the kiln exhaust gas flow path in the rising part 1b.

The bleed rate by the probe 2 is 10% or more, preferably 12% or more, and more preferably 15% or more. The bleed rate refers to a proportion (ratio) of the gas air volume (Nm3/unit time) of the bleed gas G2 bled in a unit time to the gas air volume (Nm3/unit time) of the combustion gas G1 passing through the kiln inlet 1a in a unit time.

The bleeding amount of the bleed gas G2 is preferably 2,500 Nm3/h or more, and more preferably 10,000 Nm3/h or more.

The probe 2 includes a cylindrical inner pipe 21 (corresponding to a gas pipe), a cylindrical outer pipe 22 surrounding the inner pipe 21, a cold air passage 23 formed between the inner pipe 21 and the outer pipe 22, and a supply port 24 for supplying cold air from the cold air fan 3 to the cold air passage 23. The bleed gas G2 flows in the inner pipe 21 in the direction of an arrow.

The probe 2 includes a plurality of discharge ports 250 provided penetrating through the inner pipe 21 and discharging the cold air C supplied to the cold air passage 23 toward the bleed gas G2. The discharge ports 250 are formed in a circular shape.

Figure 9:
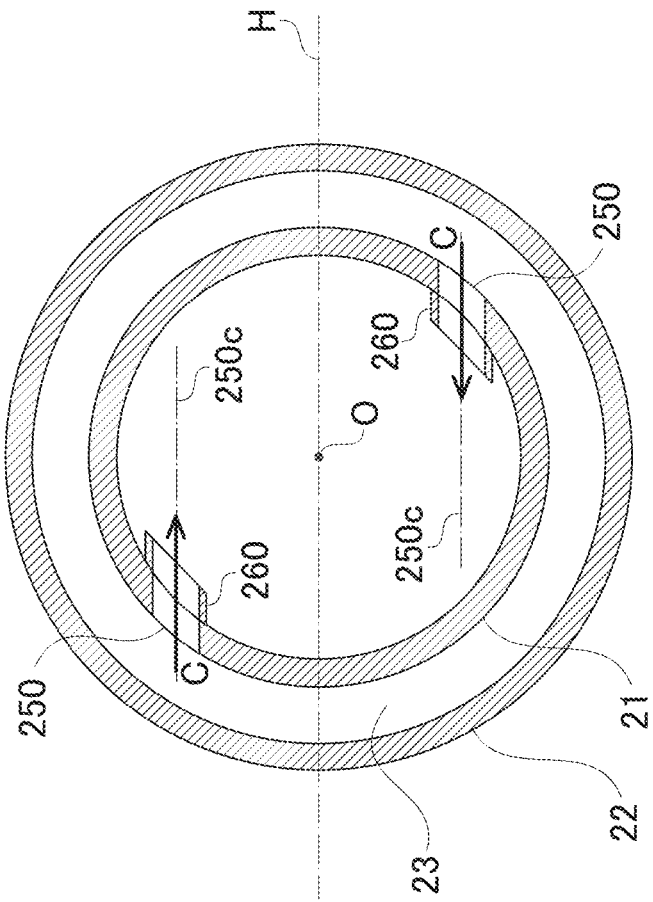
FIG. 9 is a cross-sectional view taken along line IX-IX of FIG. 8.

FIG. 9 is a view taken along line IX-IX in FIG. 8. The plurality of discharge ports 250 are disposed at substantially the same position in the extending direction of the inner pipe 21, and are preferably disposed at the same position. In other words, the plurality of discharge ports 250 are preferably disposed in a plane perpendicular to the extending direction of the inner pipe 21. However, the plurality of discharge ports 250 need not be disposed at completely the same position in the extending direction of the inner pipe 21.

In the present embodiment, the two discharge ports 250 are disposed point-symmetrically with the center O of the inner pipe 21 as a center of symmetry. The two discharge ports 250 are disposed to be shifted from each other by 180 degrees in the circumferential direction of the inner pipe 21.

The discharge ports 250 are disposed such that centers 250c are parallel to a horizontal line H. The two discharge ports 250 discharge the cold air C to the bleed gas G2 in the inner pipe 21. That is, the two discharge ports 250 are alternately disposed, and the cold airs C discharged from the respective discharge ports 250 does not collide with each other in the inner pipe 21. As a result, the cold airs C discharged from the respective discharge ports 250 do not collide with each other and do not diffuse, and flow in a direction toward the kiln inlet 1a hardly occurs. As a result, it is possible to suppress the reverse flow of the cold air C to the kiln inlet 1a and to suppress the heat loss.

The inner pipe 21 preferably has a nozzle 260 surrounding the periphery of the discharge port 250. The cylindrical nozzle 260 is disposed coaxially with the center 250c of the discharge port 250. By providing the nozzle 260 around the discharge port 250, the cold air C is discharged in a direction along the center 250c of the discharge port 250. In a case where the wall thickness of the inner pipe 21 is sufficiently large or the like, the nozzle 260 is not necessarily required.

The chlorine bypass system 100 includes a control unit (not illustrated). The control unit can adjust the output of the cold air fan 3.

The control unit adjusts the output of the cold air fan 3 such that the ratio (MC/MG) of the momentum MC of the cold air C calculated from the wind speed, air volume, and temperature of the cold air C per discharge port 250 to the momentum MG of the bleed gas G2 calculated from the wind speed, air volume, and temperature of the bleed gas G2 at the inlet 2a of the probe 2 falls within the range of 1.8 to 5.3. This is capable of sufficiently cooling the bleed gas G2 even if the bleed rate is increased, and enables operation while maintaining a predetermined chlorine removal efficiency (see Example 2 described in deinlet later).

In the present specification, the momentum (per unit time) of the gas is defined as follows.

$$\text{Momentum of gas}[kg \cdot m/s^2] = \text{density}[kg/m^3] \times \text{wind speed}[m/s] \times \text{air volume}[m^3/s]$$

When the ratio of the momentum (MC/MG) is excessively lowered, the momentum MC of the cold air C is smaller than the momentum MG of the bleed gas G2, so that it is difficult to obtain sufficient mixing with the bleed gas G2. Therefore, the ratio of momentum (MC/MG) is 1.8 or more, and preferably 3.0 or more.

Meanwhile, when the ratio of momentum (MC/MG) is excessively increased, the pressure loss increases, which makes it also necessary to increase the size of the cold air fan 3. The reduction proportion of the temperature deviation (to be described in deinlet later) in the outlet cross section 2b of the probe 2 decreases with an increase in the ratio of momentum (MC/MG), while the amount of cold air flowing backward in the probe 2 and reaching the kiln inlet 1a increases. Therefore, the ratio of momentum (MC/MG) is 5.3 or less, and preferably 4.0 or less.

The wind speed of the cold air C is preferably 25 to 180 m/s, and more preferably 50 to 150 m/s.

The ratio of momentum (MC/MG) may be increased by providing a variable nozzle (not illustrated) that varies the opening area of the discharge port 250 and increasing only the wind speed while maintaining the air volume of the cold air C.

Example 2

Hereinafter, specific Examples and the like will be described in order to describe the present invention in more deinlet, but the present invention is not limited to the aspects of these Examples.

The present inventors conducted the simulation analysis of the mixed state of a bleed gas G2 and cold air C to confirm an effect provided by the arrangement of the plurality of discharge ports 250. Software used for the simulation analysis is Fluent 2020 R2 manufactured by ANSYS.

Figure 10A:
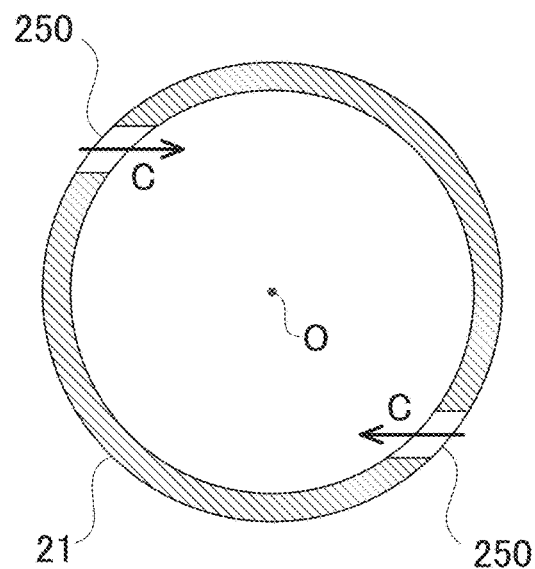
FIG. 10A is a cross-sectional view of a probe used for simulation analysis.
Figure 10B:
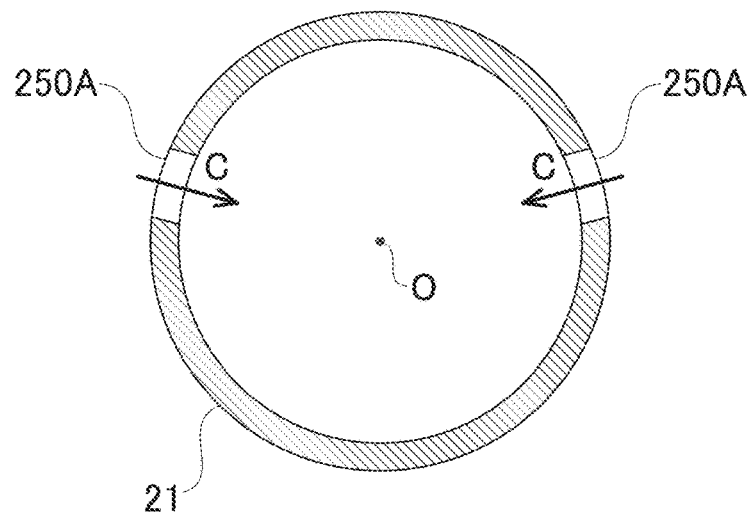
FIG. 10B is a cross-sectional view of a probe used for simulation analysis.

The cross-sectional shape of a probe used for the simulation analysis is shown in FIGS. 10A and 10B (an outer pipe 22 is not illustrated). FIG. 10A shows an example in which the pair of discharge ports 250 are disposed such that the cold air C is discharged in a direction perpendicular to the direction of flow of the bleed gas G2 bled by an inner pipe 21 and the discharged cold airs C do not collide with each other in the inner pipe 21. FIG. 10B shows an example in which the pair of discharge ports 250A are disposed so as to discharge the cold air C in a direction that is perpendicular to the direction of flow of the bleed gas G2 bled by the inner pipe 21 and that is directed toward the center of the flow of the bleed gas G2.

The analysis conditions are shown in Table 5. A bleed rate in a chlorine bypass system 100 was set to 10 to 15%. The cold air C had a temperature of 20° C., and the cold air C was introduced so that an average temperature in the outlet cross section 2b (see FIG. 2) of a probe 2 was 400° C. Under each condition, the speed of the cold air C is changed while maintaining a predetermined air volume by adjusting the area of a discharge port 250, 250A.

The wind speed of the cold air C was set in view of the ratio of the momentum of the cold air C calculated from the wind speed, air volume, and temperature of the cold air C per discharge port 250, 250A to the momentum of the bleed gas G2 calculated from the wind speed, air volume, and temperature of the bleed gas G2 at the inlet 2a of the probe 2.

In Table 5, the "cold air speed" means the wind speed of the cold air C, and the "cold air-bleed gas momentum ratio" means the ratio (MC/MG) of the momentum MC of the cold air C per discharge port 250, 250A to the momentum MG of the bleed gas G2 (the same applies to Table 6 described later). In Table 5, "alternate type" means that discharge ports are disposed as shown in FIG. 10A, and "collision type" means that discharge ports are disposed as shown in FIG. 10B.

TABLE 5

| | Conditions | | | |
|---|---|---|---|---|
| Analysis examples | Cold air speed (m/s) | Cold air-bleed gas momentum ratio | Bleed rate (%) | Type |
| 6-1 | 50 | 1.8 | 10 | Alternate type |
| 6-2 | 87 | 3.1 | | |
| 6-3 | 150 | 5.3 | | |
| 7-1 | 87 | 2.1 | 15 | Alternate type |
| 7-2 | 150 | 3.6 | | |
| 8-1 | 50 | 1.8 | 10 | Collision type |
| 8-2 | 87 | 3.1 | | |
| 8-3 | 150 | 5.3 | | |
| 9-1 | 87 | 2.1 | 15 | Collision type |
| 9-2 | 150 | 3.6 | | |

From the viewpoint of introducing cold air C so that an average temperature in the outlet cross section 2b of the probe 2 was 400° C. and lowering the temperature of the bleed gas G2 to 600 to 700° C. or lower, which was the melting point of a chlorine compound (see Japanese Patent No. 4294871), the degree of gas cooling was determined based on whether or not a temperature deviation in the outlet cross section 2b of the probe 2 was 200° C. or lower. Here, the temperature deviation in the outlet cross section 2b of the probe 2 is a variation from the average temperature in the outlet cross section 2b.

The proportion of the cold air C having reached the inlet 2a of the probe 2 was also calculated from a temperature decrease (difference from the temperature of the kiln inlet 1a) at a joint (inlet 2a) between the probe 2 and the kiln inlet 1a, and evaluated as the backflow rate of the introduced cold air C. The temperature deviation in the outlet cross section 2b of the probe 2 and the backflow rate into the kiln inlet 1a are shown in Table 6. In Table 6, "good" indicates that the reverse flow rate is 0, "average" indicates that the reverse flow rate is 10% or less, and "poor" indicates that the reverse flow rate exceeds 10%.

TABLE 6

| | Results | | | Conditions | | | |
|---|---|---|---|---|---|---|---|
| Analysis examples | Temperature deviation (° C.) | Backflow rate (%) | Determination | Cold air speed (m/s) | Cold air-bleed gas momentum ratio | Bleed rate (%) | Type |
| 6-1 | 189 | 0 | Good | 50 | 1.8 | 10 | Alternate type |
| 6-2 | 112 | 0 | Good | 87 | 3.1 | | |
| 6-3 | 60 | 0 | Good | 150 | 5.3 | | |
| 7-1 | 143 | 0 | Good | 87 | 2.1 | 15 | Alternate type |
| 7-2 | 74 | 0 | Good | 150 | 3.6 | | |
| 8-1 | 158 | 0 | Good | 50 | 1.8 | 10 | Collision type |
| 8-2 | 92 | 7.3 | Average | 87 | 3.1 | | |
| 8-3 | 56 | 12.2 | Poor | 150 | 5.3 | | |
| 9-1 | 122 | 5.7 | Average | 87 | 2.1 | 15 | Collision type |
| 9-2 | 67 | 9.8 | Average | 150 | 3.6 | | |

In the "alternate type" of Analysis Examples 6-1 to 7-2, under the same conditions, the temperature deviation is slightly higher than that of the "collision type" of Analysis Examples 8-1 to 9-2, but the temperature deviation is 200° C. or lower, and sufficient cooling is performed.

In the "alternate type" of Analysis Examples 6-1 to 7-2, no reverse flow to the kiln inlet 1a occurs. This is because, in the "collision type", the cold airs C discharged from the plurality of discharge ports 250A generates a velocity vector toward the kiln inlet 1a after colliding with each other, but in the "alternate type", the cold airs C do not directly collide with each other, so that the generation amount of the velocity vector toward the kiln inlet 1a is small.

Figure 11:
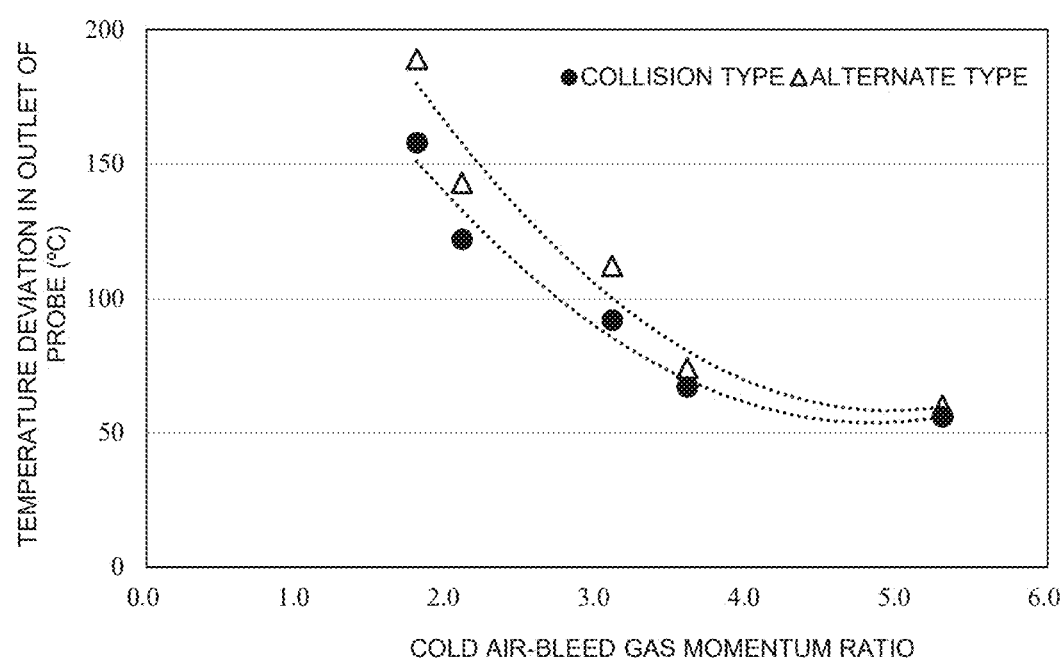
FIG. 11 is a graph showing a relationship between a cold air-bleed gas momentum ratio and a temperature deviation in the outlet cross section of the probe.

FIG. 11 shows a relationship between a cold air-bleed gas momentum ratio and a temperature deviation in the outlet cross section 2b of the probe 2. As shown in FIG. 11, the cold air-bleed gas momentum ratio is within the range of 1.8 to 5.3, and the temperature of the bleed gas G2 in the probe 2 can be uniformized earlier within the range of 3.0 to 4.0.

As described above, the probe 2 according to the present embodiment includes: the inner pipe 21 for bleeding a part of the combustion gas G1 from the kiln 1; and a plurality of discharge ports 250 each of which is provided penetrating through the inner pipe 21 and each of which discharges the cold air C to the bleed gas G2 bled by the inner pipe 21, wherein the plurality of discharge ports 250 are disposed so that the cold airs C discharged from the discharge ports 250 do not collide with each other in the inner pipe 21.

According to this configuration, the cold airs C discharged from the respective discharge ports 250 do not collide with each other and do not diffuse, and flow in a direction toward the kiln inlet 1a hardly occurs. This is capable of sufficiently cooling the bleed gas G2 even if the bleed rate is enhanced, and capable of suppressing the backflow of the cold air C to the kiln inlet 1a.

In the probe 2 according to the present embodiment, the plurality of discharge ports 250 are preferably disposed at the same position in the extending direction of the inner pipe 21.

According to this configuration, good cooling performance can be achieved.

In the probe 2 according to the present embodiment, the plurality of discharge ports 250 are preferably disposed point-symmetrically with a center O of the inner pipe 21 as a center of symmetry when viewed in an extending direction of the inner pipe 21.

According to this configuration, good cooling performance can be achieved.

In the probe 2 according to the present embodiment, the plurality of discharge ports 250 are preferably disposed at equal intervals in a circumferential direction of the inner pipe 21.

According to this configuration, good cooling performance can be achieved.

In a method for operating the probe 2 according to the present embodiment, the wind speed of the cold air C discharged from the discharge port 250 satisfies 25 to 180 m/s, and a ratio (MC/MG) of the momentum MC of the cold air C per discharge port 250 to the momentum MG of the bleed gas G2 satisfies 1.8 to 5.3.

This configuration is capable of sufficiently cooling the bleed gas G2 even if the bleed rate is enhanced, and capable of suppressing the backflow of the cold air C to the kiln inlet 1a.

In the method for operating the probe 2 according to the present embodiment, it is preferable that the cold air C does not flow backward to the kiln inlet 1a after colliding with the inner wall surface of the inner pipe 21.

This configuration can suppress the backflow rate to be low.

Note that the configurations of the combustion gas bleeding probe and the method for operating the same are not limited to those of the above-described embodiments, and the functions and effects of the combustion gas bleeding probe and the method for operating the same are not limited to those of the above-described embodiments. It is needless to say that various modifications can be made to the combustion gas bleeding probe without departing from the gist of the present invention. For example, the configurations, methods, and the like of the plurality of embodiments described above may be optionally adopted and combined. It is a matter of course that one or two or more of configurations, methods, and the like according to various modifications described below may be optionally selected and adopted for the configurations, methods, and the like according to the embodiments described above.

(1) In the probe 2 according to the above embodiment, the plurality of discharge ports 250 are disposed at the same position in the extending direction of the inner pipe 21. However, the probe 2 is not limited to such a configuration. For example, the plurality of discharge ports 250 may be disposed at different positions in the extending direction of the inner pipe 21.

Figure 12A:
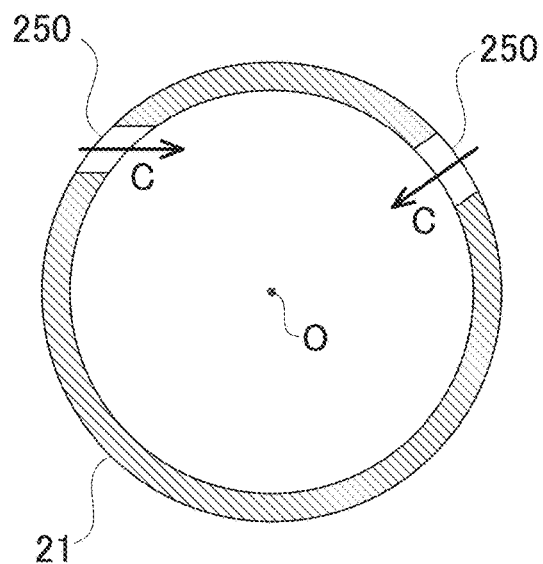
FIG. 12A is a cross-sectional view of a probe according to another embodiment.
Figure 12B:
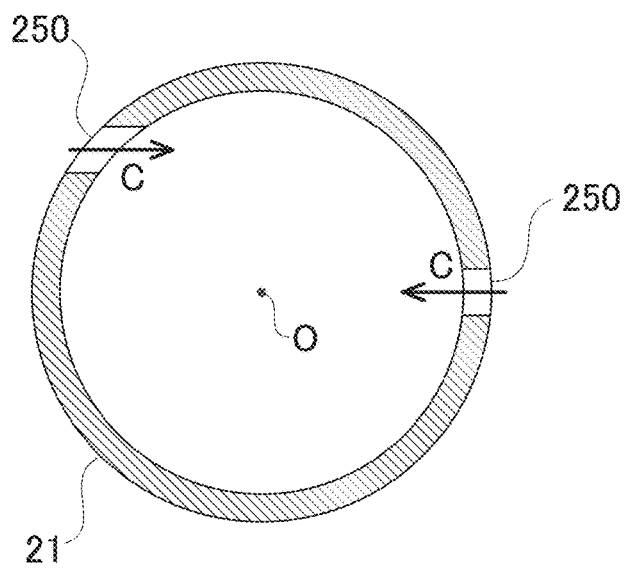
FIG. 12B is a cross-sectional view of a probe according to another embodiment.

(2) In the probe 2 according to the present embodiment, the plurality of discharge ports 250 are disposed point-symmetrically with the center O of the inner pipe 21 as a center of symmetry when viewed in the extending direction of the inner pipe 21. However, the probe 2 is not limited to such a configuration. For example, as shown in FIGS. 12A and 12B, the plurality of discharge ports 250 may not be disposed point-symmetrically with the center O of the inner pipe 21 as a center of symmetry when viewed in the extending direction of the inner pipe 21.

Figure 12C:
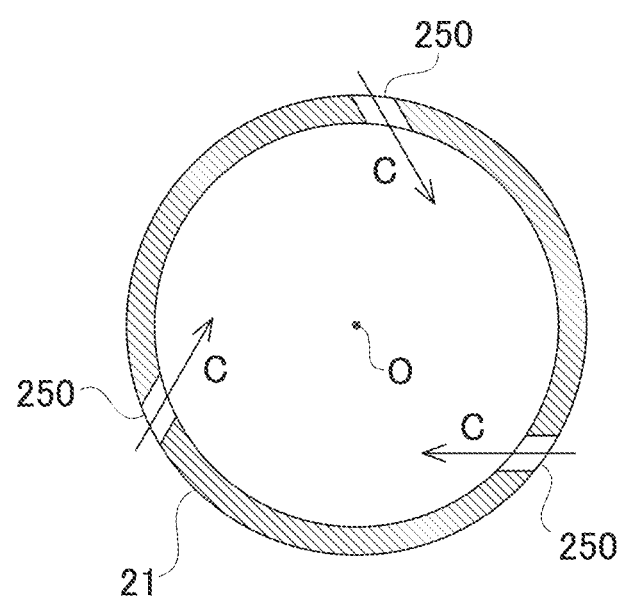
FIG. 12C is a cross-sectional view of a probe according to another embodiment.

(3) In the probe 2 according to the present embodiment, the two discharge ports 250 are disposed at equal intervals in the circumferential direction of the inner pipe 21. However, the probe 2 is not limited to such a configuration. For example, as shown in FIG. 12C, the three discharge ports 250 may be disposed at equal intervals in the circumferential direction of the inner pipe 21.

DESCRIPTION OF REFERENCE SIGNS

1 Kiln
1a Kiln inlet
1b Rising part
2 Probe
2a Inlet of probe
2b Outlet cross section of probe
3 Cold air fan
4 Inverter
5 Cyclone
6 Cooler
7 Dust collector
8 Exhaust fan
9 Measuring instrument
21 Inner pipe
22 Outer pipe
23 Cold air passage
24 Supply part
25 Discharge port
25c Center of discharge port
250 Discharge port
250c Center of discharge port
260 Nozzle
100 Chlorine bypass system
A1 Coarse powder
A2 Fine powder
C Cold air
D Probe diameter
G1 Combustion gas
G2 Bleed gas
G3 Mixed gas
G4 Mixed gas
G5 Exhaust gas
G6 Exhaust gas
H Horizontal line
MC Momentum of cold air
MG Momentum of bleed gas
O Center of inner pipe
VC Wind speed of cold air
VG Wind speed of bleed gas

What is claimed is:

1. A combustion gas bleeding probe comprising:
a gas pipe for bleeding a part of a combustion gas from a kiln; and
a plurality of discharge ports each of which is provided penetrating through the gas pipe and each of which discharges a low-temperature gas in a direction that is perpendicular to a direction of flow of a bleed gas bled by the gas pipe and that is directed toward a center of the flow of the bleed gas,
wherein the plurality of discharge ports discharge the low-temperature gas such that a ratio of a momentum of the low-temperature gas per discharge port to a momentum of the bleed gas satisfies 1.2 to 4.0, and a value ($m^{-1}$) obtained by dividing a ratio of a wind speed of the low-temperature gas to a wind speed of the bleed gas by an inner diameter of the gas pipe satisfies 1.5 to 3.5.

2. The combustion gas bleeding probe according to claim 1, wherein the plurality of discharge ports include a pair of discharge ports that are disposed opposite to each other on both sides of the gas pipe in a horizontal direction and discharge the low-temperature gas in the horizontal direction.

3. The combustion gas bleeding probe according to claim 1, wherein a wind speed of the low-temperature gas is 25 to 180 m/s.

4. The combustion gas bleeding probe according to claim 1,
wherein the low-temperature gases discharged from the plurality of discharge ports each have a velocity vector in a direction opposite to a direction of flow of the bleed gas after colliding with each other, and a ratio of the low-temperature gas flowing backward to a kiln inlet to the discharged low-temperature gas is 10% or less.

5. A method for operating a combustion gas bleeding probe, the combustion gas bleeding probe comprising:
a gas pipe for bleeding a part of a combustion gas from a kiln; and
a plurality of discharge ports each of which is provided penetrating through the gas pipe and each of which discharges a low-temperature gas in a direction that is perpendicular to a direction of flow of a bleed gas bled by the gas pipe and that is directed toward a center of the flow of the bleed gas,
wherein a ratio of a momentum of the low-temperature gas per discharge port to a momentum of the bleed gas satisfies 1.2 to 4.0, and a value ($m^{-1}$) obtained by dividing a ratio of a wind speed of the low-temperature gas to a wind speed of the bleed gas by an inner diameter of the gas pipe satisfies 1.5 to 3.5.

* * * * *

UNITED STATES PATENT AND TRADEMARK OFFICE
CERTIFICATE OF CORRECTION

PATENT NO. : 12,275,675 B1  
APPLICATION NO. : 18/845355  
DATED : April 15, 2025  
INVENTOR(S) : Koki Hamada Page 1 of 1

It is certified that error appears in the above-identified patent and that said Letters Patent is hereby corrected as shown below:

On the Title Page

Column 2 (Abstract), Line 8-9, delete "the low temperature gas" and insert -- the low-temperature gas --.

Signed and Sealed this  
Twenty-sixth Day of August, 2025

Coke Morgan Stewart  
*Acting Director of the United States Patent and Trademark Office*